(12) United States Patent
Chen et al.

(10) Patent No.: US 9,104,897 B2
(45) Date of Patent: *Aug. 11, 2015

(54) TRANSCEIVER LOCKING ASSEMBLY

(71) Applicant: INTERNATIONAL BUSINESS MACHINES CORPORATION, Armonk, NY (US)

(72) Inventors: Lei Chen, Shanghai (CN); Martin Tiernan, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 255 days.

This patent is subject to a terminal disclaimer.

(21) Appl. No.: 13/757,186

(22) Filed: Feb. 1, 2013

(65) Prior Publication Data

US 2014/0223585 A1  Aug. 7, 2014

(51) Int. Cl.
G06F 21/88 (2013.01)
(52) U.S. Cl.
CPC ..................... *G06F 21/88* (2013.01)
(58) Field of Classification Search
CPC ..................................................... G06F 21/88
USPC ..................................................... 726/34–35
See application file for complete search history.

(56) References Cited

U.S. PATENT DOCUMENTS

| 5,901,263 | A | 5/1999 | Gaio et al. | |
|---|---|---|---|---|
| 7,255,484 | B2 | 8/2007 | Walker, Jr. et al. | |
| 7,733,906 | B2 * | 6/2010 | Raman et al. | 370/469 |
| 2005/0141827 | A1 * | 6/2005 | Yamada et al. | 385/92 |
| 2005/0158051 | A1 | 7/2005 | Dodds | |
| 2005/0248543 | A1 * | 11/2005 | North et al. | 345/173 |
| 2006/0143717 | A1 * | 6/2006 | Ransome et al. | 726/35 |
| 2010/0008630 | A1 * | 1/2010 | Marrapode et al. | 385/78 |
| 2010/0283579 | A1 * | 11/2010 | Kraus et al. | 340/5.7 |
| 2011/0058777 | A1 | 3/2011 | Gazzola et al. | |
| 2012/0020628 | A1 | 1/2012 | Chan et al. | |

FOREIGN PATENT DOCUMENTS

| CN | 100508298 C | 8/2005 |
|---|---|---|
| JP | EP001548896 A2 | 6/2005 |

OTHER PUBLICATIONS

William K Hogan et al, "SMT Connectors for Removable Small-Form-Factor Transceiver Modules", 2000.

* cited by examiner

*Primary Examiner* — Chau Le
(74) *Attorney, Agent, or Firm* — Griffiths & Seaton PLLC

(57) ABSTRACT

A transceiver locking assembly includes at least one processor device, a network device, in a network environment, in communication with the least one processor device, a transceiver in communication with the network device; a transceiver port, coupled to the network device, defining a first slot opening in at least one of a variety of positions of the transceiver port and configured for selectively receiving the transceiver, and a dynamically controlled locking mechanism coupled to the transceiver port. The dynamically controlled locking mechanism is selectively positioned into the first slot opening to lock the transceiver into the network device or selectively removed away from the first slot opening to unlock the transceiver from the network device.

20 Claims, 8 Drawing Sheets

TRANSCEIVER LOCKING ASSEMBLY

BACKGROUND OF THE INVENTION

1. Field of the Invention

The present invention relates in general to computers, and more particularly to a transceiver locking assembly in a computing environment.

2. Description of the Related Art

In today's society, computer systems are commonplace. Computer systems may be found in the workplace, at home, or at school. Computer systems may include networking systems, data storage systems, or disk storage systems, to process and store data. Small form-factor pluggable (SFP) transceivers are devices used as an interface between a network device (e.g., switch, router, host adapter) and a fiber optic or copper networking cable. They can be plugged into ports on network devices and easily removed. This makes them subject to removal by mistake or by unauthorized persons, causing disruption to network traffic, data loss and downed links between devices. SFPs are difficult to track, very small and can be easily sold online and by other means. SFPs have become very expensive with some types costing thousands of dollars or more. The temptation for theft as well as the risk to data loss and network outages creates a need for a motorized locking mechanism to lock an SFP into its port, making it impossible to remove without the owner's permission.

SUMMARY OF THE DESCRIBED EMBODIMENTS

Various device and method embodiments, for a transceiver locking assembly are included. The transceiver locking assembly includes at least one processor device, a network device, in a network environment, in communication with the least one processor device, a transceiver in communication with the network device; a transceiver port, coupled to the network device, defining a first slot opening in at least one of a variety of positions of the transceiver port and configured for selectively receiving the transceiver, and a dynamically controlled locking mechanism coupled to the transceiver port. The dynamically controlled locking mechanism is selectively positioned into the first slot opening to lock the transceiver into the network device or selectively removed away from the first slot opening to unlock the transceiver from the network device.

In addition to the foregoing exemplary embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
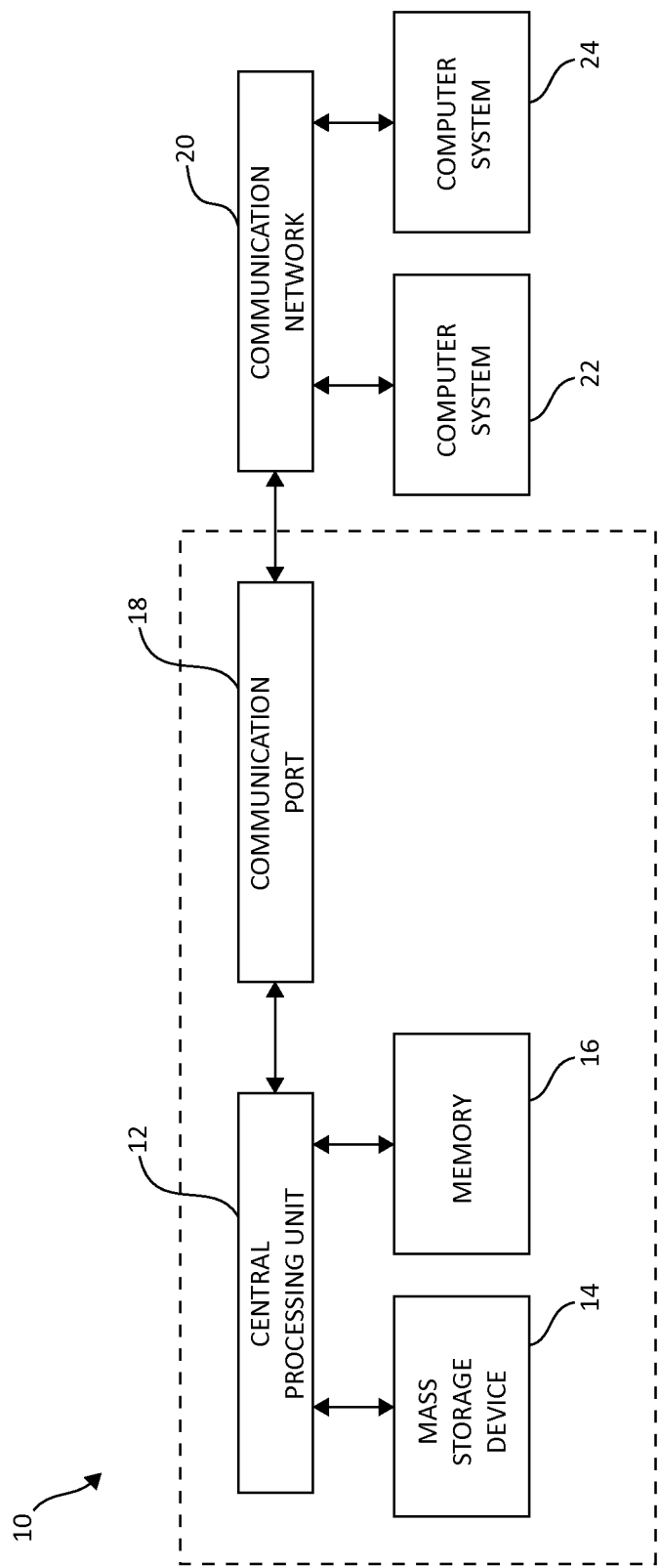
FIG. 1 is a block diagram illustrating a computing system environment in which aspects of the present invention may be realized.

As shall be described herein, a transceiver module may be used with communications equipment, and connects to the communications equipment for bi-directional transmission of data between an outside communications interface and the communications equipment. A transceiver module may be an electrical transceiver module used in an electrical-electrical interface, or an optoelectrical transceiver module used in an optic-electrical interface.

In one embodiment, a small form-factor pluggable (SFP) module is inserted into an electrical connector receptacle and connects to a host connector connected to a circuit board. The SFP module typically includes a transceiver for either copper or fiber optic based network systems. Moreover, the small form-factor pluggable (SFP) transceivers may be devices used as the interface between a network device switch, router, host adapter) and a fiber optic or copper networking cable. The SFP transceivers may be plugged into ports on network devices and easily removed. This makes them subject to removal by mistake or by unauthorized persons, causing disruption to network traffic, data loss and downed links between devices. Given the relatively small sizes of the SET transceivers, the SFP transceivers can be easily sold online or by other means, and are difficult to track and monitor. The SFP transceivers have become very expensive. The temptation for theft, as well as the risk to data loss and network outages, builds a compelling ease for the ability to lock an SFP into its port, making it impossible to remove without the owner's permission.

Currently, SFP transceivers are inserted into a network device port, and stay in place by a simple friction mechanism, which keeps them inserted so as not to inadvertently be removed during cable removal. They are, however, not permanently locked, but only secured to the network device by using a small lever that releases the friction, making it possible to easily remove. Having the ability to actually lock an SFP transceiver into its port would prevent theft and any other inadvertent or unauthorized removal. Therefore, a need exists for a small form factor transceiver locking assembly to dynamically lock and unlock the SEP transceivers to the network device/port (e.g., switch, router, host adapter), a fiber optic or copper networking cable.

In one embodiment, a transceiver locking assembly is provided. The transceiver locking assembly includes at least one processor at least one processor device, a network device, in a network environment, in communication with the least one processor device, a transceiver (e.g., a small form factor pluggable transceiver) in communication with the network device; a transceiver port, coupled to the network device, defining a first slot opening in at least one of a variety of positions of the transceiver port and configured for selectively receiving the transceiver, and a dynamically controlled locking mechanism coupled to the transceiver port. The dynamically controlled locking mechanism is selectively positioned into the first slot opening for one of locking the transceiver into the network device and selectively positioned from the first slot opening for unlocking the transceiver from the network device upon a command being issued to the network device.

In one embodiment, a transceiver locking assembly is provided. The transceiver locking assembly includes at least one processor at least one processor device, a network device, in a network environment, in communication with the least one processor device, a transceiver (e.g., a small form factor pluggable transceiver) in communication with the network device, a transceiver port, coupled to the network device, defining a first slot opening in at least one of a variety of positions of the transceiver port and configured for selectively receiving the transceiver, and a dynamically controlled locking mechanism coupled to the transceiver port. A second slot opening is defined in at least one of a variety of positions on the transceiver. The dynamically controlled locking mechanism is selectively positioned into the first slot opening and the second slot opening for one of locking the transceiver into the network device and selectively positioned from the first slot opening and the second slot opening for unlocking the transceiver from the network device upon a command being issued to the network device.

In one embodiment the present invention allows a tranceiver to be locked in place (e.g., locked into a tranceiver cage/port) and unlocked using a dynamically controlled locking mechanism by issuing a command from a user interface such as a command line interface (CLI) or graphical user interface (GUI) and the like. In one embodiment, a tranceiver is prevented from being inserted into a tranceiver port/tranceiver cage, which prevents an unauthorized connection from being acheived, making access to data impossible. Issued commands (e.g., a "lock_tranceiver" and an "unlock_tranceiver" command) for locking and unlocking the dynamically controlled locking mechanism may only be issued after a user has authenticated with required authority to issue the commands. After either the locking and/or unlocking command is successfully issued, a mechanism within the hardware system, e.g., fiber channel switch, ethernet switch, host bus adapter card, network interface card, and the like would may be used engage or disengage the lock. The dynamically controlled locking mechanism may be a small solenoid, motor or other mechanical device that may be electrically/dynamically controlled. In one embodiment, the dynamically controlled locking mechanism includes a small pin, locking device, button, or tab or the like would enter into and/or be released from a hole or recess (e.g., a slot opening) in the tranceiver port/cage and/or transciever itself, thus creating the lock. The tranceiver may be locked to prevent its removal from anyone without the proper authority. The dynamically controlled locking mechanism, by a remote command and thereby functioning as a remotely controlled switching mechanism, may also be engaged in an unoccupied transceiver port/cage in order to prevent unauthorized insertion of a tranceiver, thus preventing unauthroized access to systems and data. In other words, the dynamically controlled locking mechanism is controlled by a remote command. The dynamically controlled locking mechanism also prevents an insertion of the transceiver into the transceiver port by a remote command It should be noted that the mechanisms of the present invention does not require or use a manual locking/latching device. In one embodiment, the dynamically controlled locking mechanism may not be accessed manually and may not not be visible when the tranceiver is installed. In one embodiement, a software code/algorithm is used to engage the lock and the software code/algorithm utilizes security features that allow only certain user who have the required authority to be able to lock and unlock the tranceiver. Thus, the software code/algorithm, using the dynamically controlled locking mechanism, prevents unauthorized removal of the tranceiver and may also prevent unauthorized insertion of a tranceiver when the lock-_tranceiver command is issued to an unoccupied port/cage (e.g., the locking pin/tab of the dynamically controlled locking mechanism may protrude into the cage (which my have a first slot opening) thus preventing an SFP from being inserted). The dynamically controlled locking mechanism prevents removal and/or even insertion of a tranceiver without the required authority, and the dynamically controlled locking mechanism is operated remotely using software code. In one embodiment, the dynamically controlled locking mechansim applies only to small form factor pluggable (SFP) transcivers and other removable tranceivers, except for not small form factor (SFF) transcivers.

In one embodiment, the present invention uses a command line interface (CLI) or graphical user interface (GUI) that requires a user to login with root authority and issue a command to remotely release the tranceiver. In one embodiemnt, the dynamically controlled locking mechansim utilizes an automated dynamically controlled locking mechansims (e.g., a solenoid or motor), which would release a pin or tab that inserts into a recess or slot in the tranceiver (the slot opening may be a second slot opening and the port or cage may have the first slot opengin) and thus differes from a latching mechanism which temporarily keeps the SFP transceiver in place and/or can be removed by anyone who may manually remove the transceiver, such as using a bail/handle that may be physically grasped and manually pulled to released a transceiver.

Turning now to FIG. 1, exemplary architecture 10 of a computing system environment, in which aspects of the present invention may be realized, is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EE-PROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12. It should be noted that the above described computing system is illustrated, by way of example only, as one type of environment the present invention may be used in and also using at least one or more of the central processing units (CPU) 12

Figure 2:
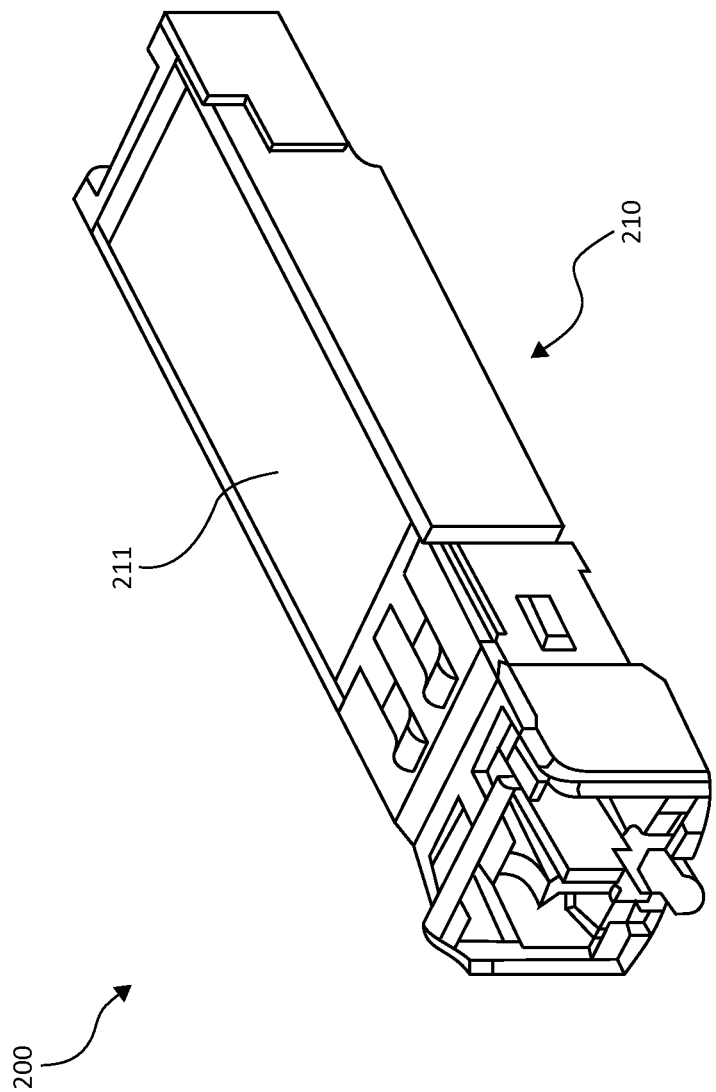
FIG. 2 is a perspective view illustrating of a small form factor pluggable (SFP) transceiver in which aspects of the present invention may be realized.

FIG. 2 is a perspective view illustrating of a small form factor pluggable (SFP) transceiver 200 in which aspects of the present invention may be realized. With reference to FIG. 2, a small form-factor pluggable (SFP) transceiver module 210 is a compact, SFP transceiver 210 used for both telecommunication and data communications applications. The SFP transceiver module 210 interfaces a network device mother board (see FIG. 4 404) (e.g., for a switch, router, media converter or similar device) to a fiber optic or copper networking cable. SFP transceiver modules 210 are designed to support SONET, Gigabit Ethernet, Fibre Channel, and other communications standards. The SFP transceiver 210 allows greater port density (e.g., a greater number of transceivers per cm along the edge of a mother board). SFP transceiver modules 210 are available with a variety of different transmitter and receiver types, allowing users to select the appropriate transceiver 210 for each link to provide the optical transmission characteristics required over the available optical fiber type (e.g., multi-mode fiber or single-mode fiber). Optical SFP transceiver modules are available in several different categories. SFP transceivers modules 210 are also available with a copper cable interface, allowing a host device designed primarily for optical fiber communications to also communicate over unshielded twisted pair networking cable. The SFP transceivers modules 210 have capabilities for a variety data rates. A portable SFP transceiver modules 210 can be successively inserted to quickly and easily determine their respective vendors or vendor-specific specifications until the correct vendor's SFP transceiver module or otherwise compatible SFP transceiver module 210 is located (e.g., from among many SFP transceiver modules carried by the user in the field) for use as a replacement. The SFP transceiver module 210 may have one or more slot openings (not shown) defined in one or more positions on the SFP transceiver module 210 for receiving a dynamically controlled locking mechanism. For example, a slot opening may be located on a top, bottom, side, or back location of the SFP transceiver module 210.

Figure 3:
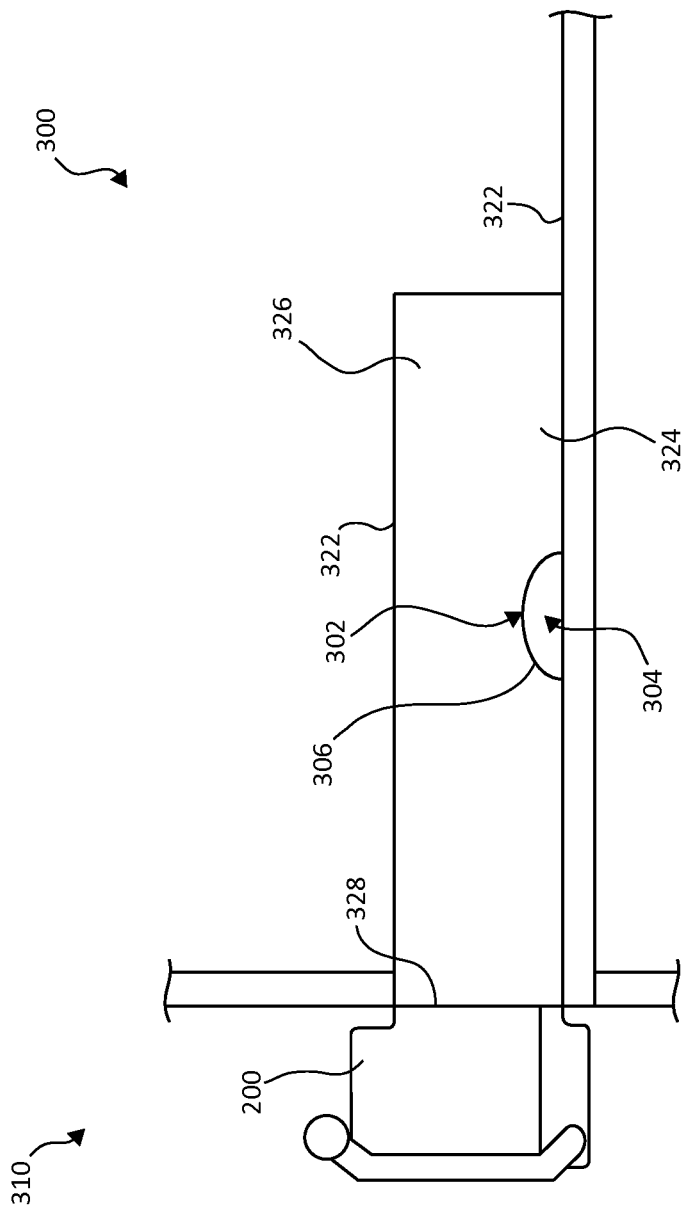
FIG. 3 is a block diagram illustrating an dynamically controlled locking mechanism in small form factor transceiver locking assembly in which aspects of the present invention may be realized.
Figure 4:
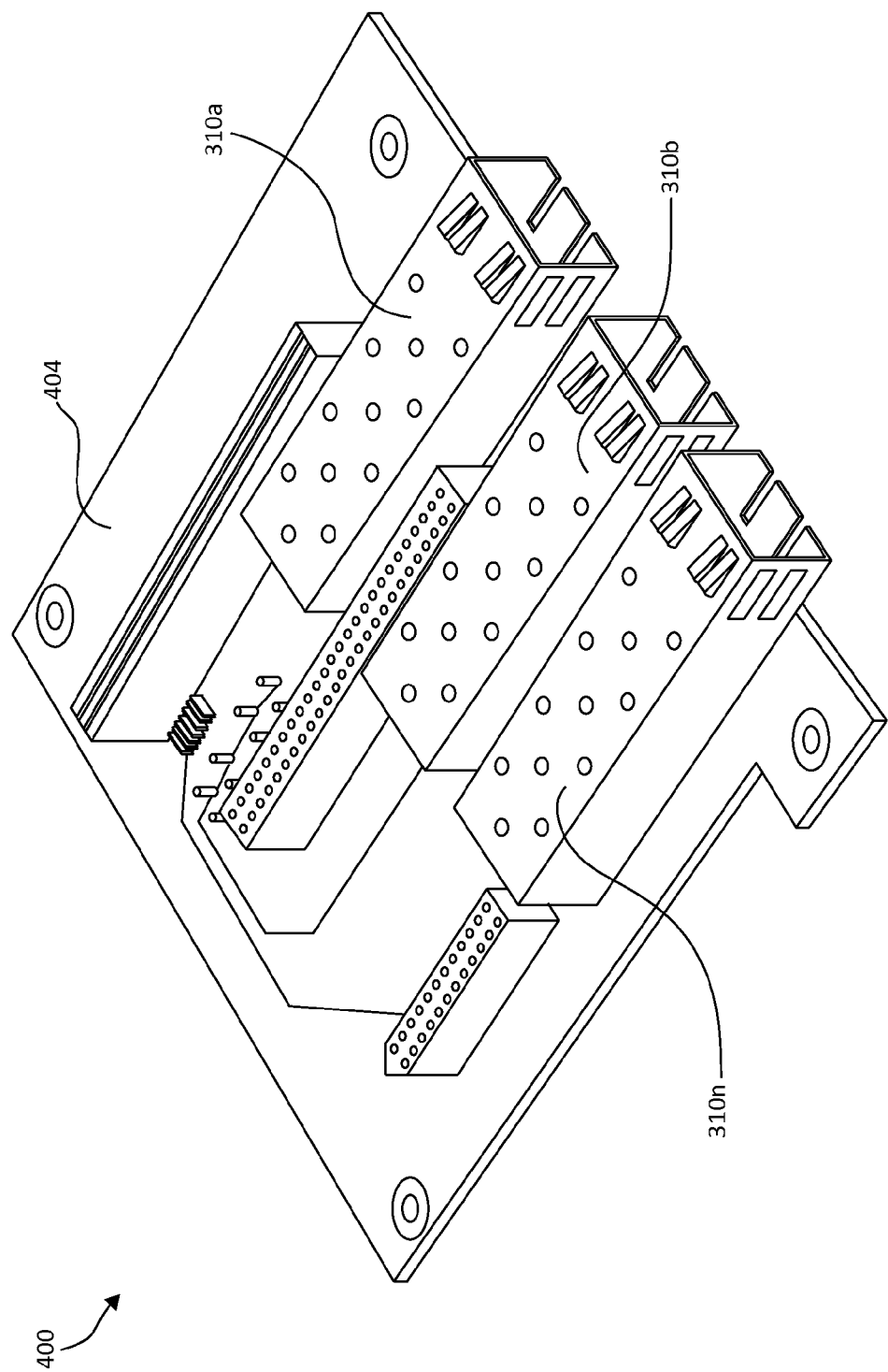
FIG. 4 is a block diagram illustrating an dynamically controlled locking mechanism in small form factor transceiver locking assembly in which aspects of the present invention may be realized.

FIG. 3 is a block diagram illustrating a dynamically controlled locking mechanism in small form factor transceiver locking assembly in an SFP transceiver cage 310 in which aspects of the present invention may be realized. It should be noted that the term SFP transceiver cage is used and described herein, but the term network port may also be used and interchanged with the SFP transceiver cage 310. Thus, for simplicity the term SFP transceiver cage 310 is used but may be interchanged/replaced with a network port for describing the present invention. For example, in one embodiment, the SFP transceiver cage 310 is located inside the network port. The SFP transceiver cage 310 comprises an upper shell 322 and a lower shell 324 that are mated to define a module retention chamber 326. The module retention chamber 326 is accessible through an open front end 328. Lower shell 324 includes a locking mechanism 306 located in one of multiple location types, such as on the base portion 332. A slot opening and/or groove 302 will be made on a SFP transceiver cage/port 310 (e.g., a slot opening may be made on the network port or the SFP transceiver cage and/or on both the network port and the SFP transceiver cage), and a motor driven button, pin, shaft, or other type of locking device 304 will be added on a SFP transceiver slot. As illustrated in FIG. 4, the SFP transceiver cages/network port 310 (FIG. 3 310 and illustrated in FIG. 4 as 310a-n from FIG. 3) may be coupled to and/or soldered to a circuit board 404 (see FIG. 4 404) of a networking device (not shown).

In one embodiment, the SFP transceiver (see FIG. 2 200 and/or FIG. 5 500 and herein referenced only for FIG. 2 200 for simplicity) may be dynamically locked into the SFP transceiver cage 310 of the network port in which the SFP transceiver (see FIG. 2 200 and/or FIG. 5 500) is plugged into, making it impossible for the SFP transceiver (FIG. 2 200) to be removed until it is unlocked by dynamically releasing the locking mechanism. The SFP transceiver cage 310 of the network device (not shown), which accepts the SFP transceiver (FIG. 2 200), would have a dynamically controlled mechanism (e.g. a solenoid) 304 that may engage/lock the SFP transceiver (FIG. 2 200) using the locking mechanism 306. The small form factor transceiver locking assembly 306 would engage the SFP transceiver (FIG. 2 200) via a specially designed slot, tab, or other opening or groove 302 thereby making it impossible to remove the SFP transceiver while the SFP transceiver (FIG. 2 200) is inserted into the port without a root user (or a user having proper authority/credentials) of the network device may issue a command from a command line interface (CLI) or graphical user interface (GUI) which would release the SFP transceiver thereby making it possible to remove it from the network device. Each port on a switch may be marked as locked/unlocked. The status of the switch may set by the switch administrator for indicating whether the SFP transceiver is locked and/or unlocked. After the SFP transceiver (FIG. 2 200) is plugged into the slot (e.g. the SFP transceiver cage 310 or port), an administrator may change the status on the network port to "locked." At that point, the locking button 304 will be raised up (e.g., raised in a substantially perpendicular manner to the base of the port) up into a slot of the SFP transceiver (FIG. 2 200) to stop the SFP transceiver (FIG. 2 200) from being removed. It should also be noted that the locking button 304 may be inserted into the slot opening of the SFP transceiver in one of a variety of manners depending on the location of the slot opening on the SFP transceiver. For example, if the slot opening is located on the rear, back portion of the SFP transceiver, the locking button 304 may be inserted into the slot opening of the SFP transceiver in a substantially horizontal position and/or one of a variety of angled positions (e.g., horizontal to the base of the network port). Alternately, if the port is set to unlocked, the button, pin, and/or shaft of the locking mechanisms 304 may be lowered down, so that SFP transceiver (FIG. 2 200) may be removed/pulled out freely from the port/cage of the network device. It should also be noted that the locking button 304 may be removed from the slot opening of the SFP transceiver in one of a variety of manners depending on the location of the slot opening on the SFP transceiver. For example, if the slot opening is located on the rear, back portion of the SFP transceiver, the locking button 304 may be removed from the slot opening of the SFP transceiver in a substantially horizontal position and/or one of a variety of angled positions (e.g., horizontal to the base of the network port).

Only an administrator and/or a user with appropriate permissions that have been granted may be able to control the button 304 to release and/or lock the SFP transceiver (FIG. 2

200) from the SFP transceiver cage 310 in the network port of the network device (not shown), which accepts the SFP transceiver (FIG. 2 200). In one embodiment, to remove the SEP transceivers (FIG. 2 200) from the SFP transceiver cage 310 (e.g., an opening of a receptacle of the network device), the locking mechanism 306 must be disengaged by receipt of the command issued by administrator and/or by a user with appropriate permissions granted may be able to control the locking mechanism.

Figure 5:
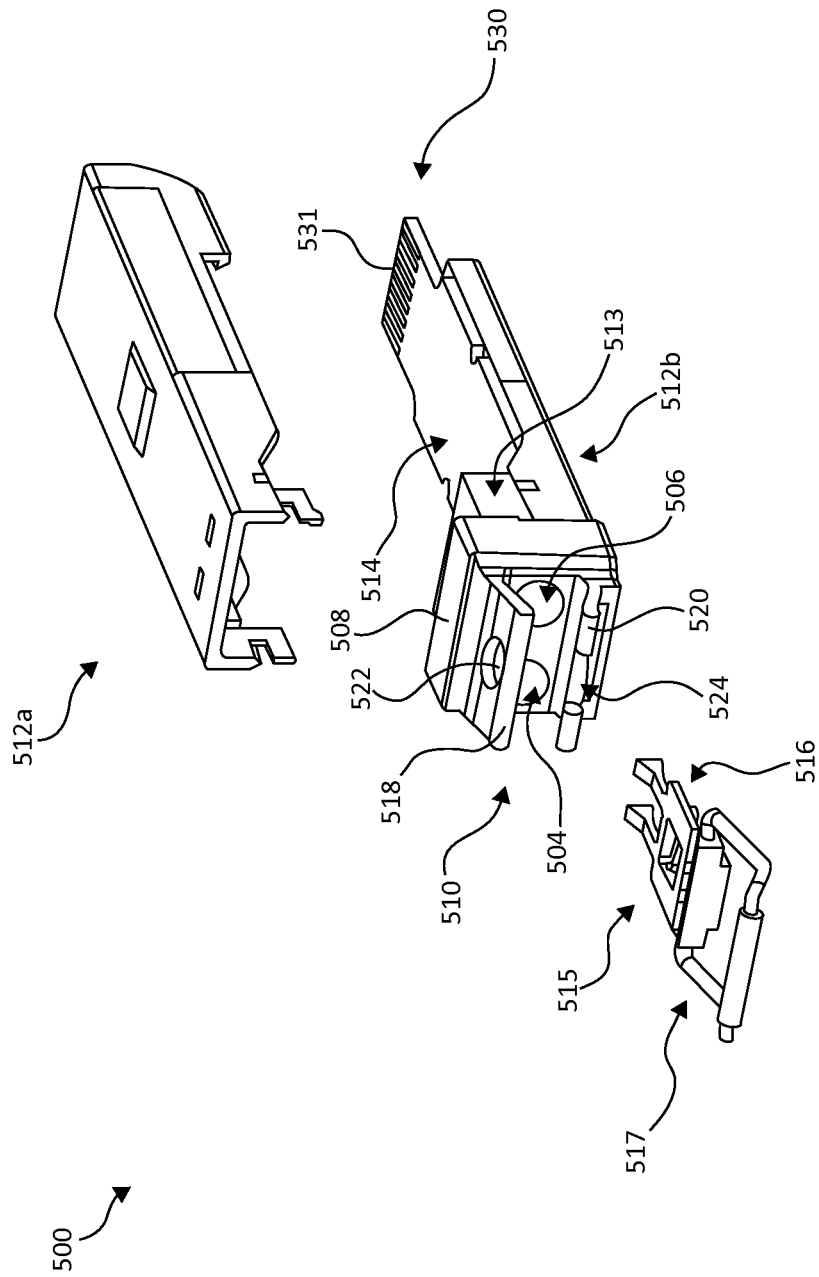
FIG. 5 is a perspective view of an small form factor optical transceiver shown partially disassembled in which aspects of the present invention may be realized.

FIG. 5 is a perspective view of a small form factor pluggable (SFP) optical transceiver 500 shown partially disassembled in which aspects of the present invention may be realized. In addition to the SFP transceiver (FIG. 2 200), in SFP optical communications systems, an optical fiber cable having a transmit optical fiber and an optical fiber cable having a receive optical fiber are terminated on their ends with a duplex connector that plugs into a duplex receptacle of the SFP housing. The duplex receptacle is secured to the housing of the duplex SFP system. The housing of the duplex SFP system is typically configured to be inserted into a cage. The housing includes an optical system, two active optical elements (i.e., a light source and a light detector), and electrical circuitry. FIG. 5 illustrates a perspective view of the SFP optical transceiver module 500 in its partially disassembled form that may also be locked and unlocked according to the embodiments described herein. In accordance with the embodiment described herein, the SFP optical transceiver module 500 includes a duplex receptacle 508, an upper housing portion 512A, a lower housing portion 512B, an optical assembly 513, an electrical assembly 514, and a latching mechanism 515. The upper and lower housing portions 512A and 512B are pressed together to cause locking features on the upper and lower housing portions 512A and 512B to interlock. In accordance with this embodiment, the electrical assembly 514 comprises a PCB having a plug end 530 with electrical contacts 531 located thereon. As will be described below with reference to FIG. 6, when the SFP optical transceiver module 500 is inserted into a cage receptacle/network port, the electrical contacts 531 on the plug end 530 come into contact with electrical connections of a communications management system.

The SFP optical transceiver module 500 includes both transmitter and receiver components to form an optical transceiver module. In accordance with an embodiment, the duplex receptacle 508 of the SFP optical transceiver module 500 has a C-shaped opening 510 formed therein that is defined by upper and lower flexible retaining elements 518 and 520, respectively, for receiving and retaining the duplex fiberoptic connector within the SFP optical transceiver module 500. This configuration of the duplex receptacle 508 enables the module 500 to have backwards compatibility with existing Versatile Link (VL) connectors that are commonly used in, for example, industrial fiber optic links. Furthermore, the connector and the SFP optical transceiver 500 support the small form factor transceiver locking assembly (FIG. 3 306) as described herein. The duplex receptacle 508 has a slot 522 formed in the upper flexible retaining element 518 and a cut-away 524 formed in the lower flexible retaining element 520.

The housing 512A, 512B of the SFP optical transceiver module 500 houses an optical transmitter and an optical receiver, which are not shown in FIG. 5 for ease of illustration. As is known in the art, the optical transmitter generally comprises components for generating an optical signal (e.g., a light source, such as a light-emitting diode (LED) or laser diode), and one or more optical elements for directing light into the end of a transmit optical fiber. The optical receiver generally comprises the components for receiving an optical signal (e.g., a photodetector or photosensor, such as a photodiode), and one or more optical elements for directing light output from the end of a receive optical fiber onto the photodetector or photosensor. The optical elements of the transmitter and receiver of the module 500 are part of an optical assembly 513 that couples to the duplex receptacle 508.

As indicated above, the SFP optical transceiver module 500 has an electrical assembly 514 (e.g., a PCB) that includes a plug end 530 for electrically interfacing the electrical circuitry of the module 500 with electrical circuitry of a communication management system (not shown), such as, for example, a network hub, a router, a switch, or any other data communication device or equipment. Thus, the SFP optical transceiver module 500 is "pluggable". The term "pluggable", as that term is used herein, may include the meaning that the module 500 can be plugged into and unplugged from a mating receptacle (not shown) of a communications management system. The act of plugging the module 500 into the mating receptacle of the communications management system causes the electrical interconnections to be made between electrical circuitry of the module 500 and electrical circuitry of the communications management system. In other words, the electrical connection between the plug end 530 and the electrical contacts (not shown) of the communications management system (not shown) is parallel to the direction of insertion of the module 500 into the communications management system. The act of unplugging the module 500 from the communications management system causes the electrical interconnections between the electrical circuitry of the module 500 and electrical circuitry of the communications management system to be removed. The housing 512A, 512B may comprise any suitable material. In one embodiment, the housing 512 may be integrally formed from a plastic or similar material using, for example, injection molding or other manufacturing techniques. In other embodiments, the housing 512 may comprise separate components made of other materials, which are joined together to form the optical transceiver module 500. The SFP transceiver module 500 may have one or more slot openings (not shown) defined in one or more positions on the SFP transceiver module 500 for receiving a dynamically controlled locking mechanism. For example, a slot opening may be located on a top, bottom, side, or back location of the SEP transceiver module 500.

Figure 6:
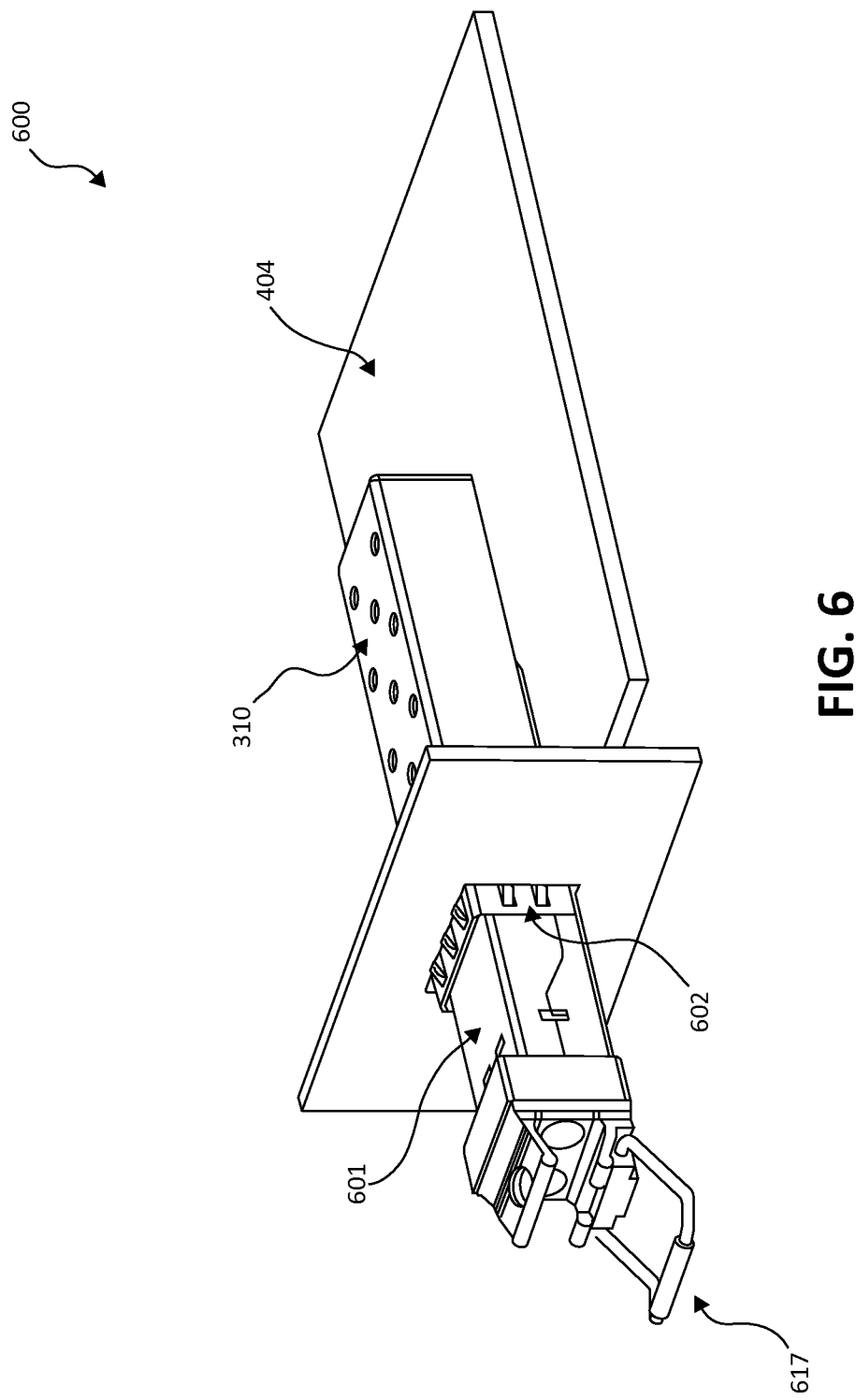
FIG. 6 is a perspective view of an small form factor optical transceiver shown assembled in which aspects of the present invention may be realized.

The latching mechanism (FIG. 3 306), which operates to lock and unlock the optical transceiver module 500 to a SFP transceiver cage and/or a network port (FIG. 3 310) and will be described with reference to FIG. 6. FIG. 6 illustrates a perspective view of the SFP optical transceiver 500 shown in FIG. 5 as the module 500 is being inserted into a housing 602 of a SFP transceiver cage and/or a network port (FIG. 3 310) of a communications management system 600. The SFP transceiver cage (FIG. 3 310) may be connected and/or coupled to a printed circuit board (PCB) (FIG. 4 404), which is also part of the communications management system 600. The PCB (FIG. 4 404) includes electrical interconnections (not shown) that come into contact with the electrical contacts 531 located on a plug end of the electrical assembly (not shown), which is typically a PCB (FIG. 5 504).

In one embodiment, the SFP optical transceiver 500 may be dynamically locked into the SFP transceiver cage (FIG. 3 310) of the network port in which the SFP optical transceiver 500 is plugged into, making it impossible for the SFP optical transceiver 500 to be removed until it is unlocked by dynamically releasing the locking mechanism. The SFP transceiver cage (FIG. 3 310) of the network device (not shown), which accepts the SFP optical transceiver 500, would have a dynamically controlled mechanism (e.g. a solenoid) (FIG. 3 304) that may engage/lock the SFP from within the locking mechanism 306. The small form factor transceiver locking assembly 306 would engage the SFP optical transceiver 500 via a specially designed slot, tab, and/or other opening or groove 302 thereby making it impossible to remove while inserted into the port. A root user of the network device may issue a command from a command line interface (CLI) or graphical user interface (GUI) which would release the SFP transceiver thereby making it possible to remove it from the network device. Each network port may include a switch that may be marked as locked/unlocked. The setting of the switch may be dynamically controlled using a software algorithm. In one embodiment, the switches are remotely controlled for setting and changing the status of the locking mechanism. In one embodiment, one or more locking mechanisms may be used for locking the SFP transceiver into the network port. In such a case, more than one slot openings may be required for accommodating each of the locking mechanisms. For example, there may be a locking mechanisms located on the top, rear and/or both sides of the network port.

The status of the switch may be set (e.g., dynamically and/or remotely set) by the switch administrator for indicating whether the SFP transceiver is locked and/or unlocked. After the SFP optical transceiver 500 is plugged into slot (e.g. the SFP transceiver cage See FIG. 3 310), an administrator could change the status to "locked," and the lock button (see FIG. 3 304) may be raised up to prevent the SFP optical transceiver 500 from being removed. It should also be noted that the locking button 304 may be inserted into the slot opening of the SFP transceiver 500 in one of a variety of manners depending on the location of the slot opening on the SFP transceiver 500. For example, if the slot opening is located on the rear, back portion of the SFP transceiver 500, the locking button (see FIG. 3 304) may be inserted into the slot opening of the SFP transceiver 500 in a substantially horizontal position and/or one of a variety of angled positions (e.g., horizontal to the base of the network port see FIG. 3 310).

Alternately, in one embodiment, if the network port is set to "unlocked," the button, pin, and/or shaft of the locking mechanism (FIG. 3 304) may be lowered down, so that the SFP optical transceiver 500 can be pulled out freely. It should also be noted that the locking button (see FIG. 3 304) may be removed from the slot opening of the SFP transceiver 500 in one of a variety of manners depending on the location of the slot opening on the SFP transceiver. For example, if the slot opening is located on the rear, back portion of the SFP transceiver 500, the locking button 304 may be removed from the slot opening of the SFP transceiver 500 in a substantially horizontal position and/or one of a variety of angled positions (e.g., horizontal to the base of the network port see FIG. 3 310).

Only an administrator and/or a user with appropriate permissions that have been granted may be able to control the button, pin, and/or shaft of the locking mechanism to release and/or lock the SFP optical transceiver 500 from the SFP transceiver cage (FIG. 3 310) in the network port of the network device (not shown), which accepts the SFP optical transceiver 500. In one embodiment, to remove the SFP optical transceiver 500 from the SFP transceiver cage (FIG. 3 310) (e.g., an opening of a receptacle of the network device), the locking mechanism (FIG. 3 306) must be disengaged by receipt of the command issued by administrator and/or user with appropriate permissions granted may be able to control the locking mechanism.

Figure 7:
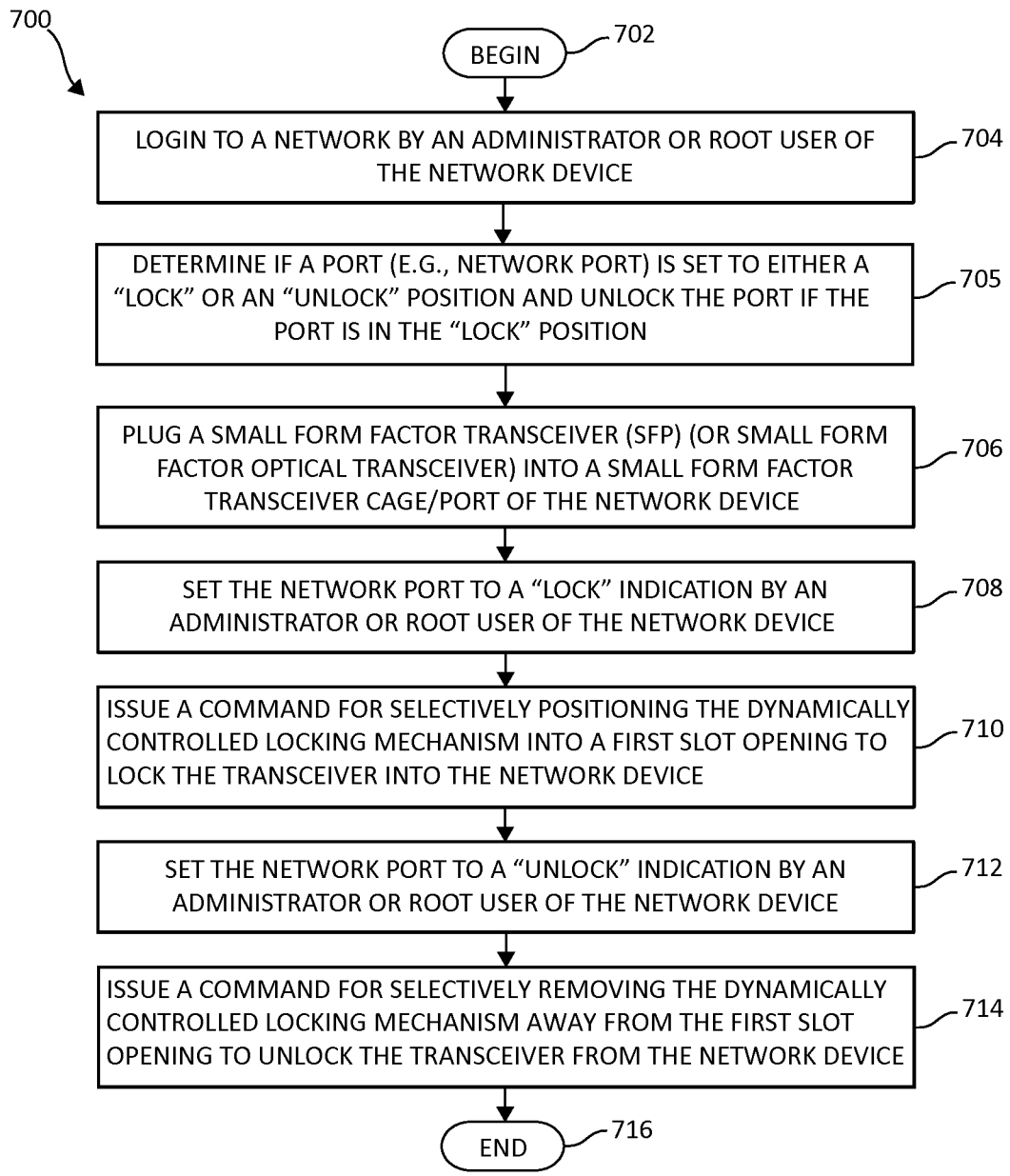
FIG. 7 is a flow chart illustrating an exemplary method for locking and unlocking the small form factor transceiver in which aspects of the present invention may be realized.

FIG. 7 is a flow chart illustrating an exemplary method 700 for locking and unlocking the small form factor transceiver in which aspects of the present invention may be realized. The method begins (step 702) by an administrator and/or root user of the network device logging into a network environment (step 704). The method 700 checks whether the port (e.g., network and/or transceiver port) is set to either a "lock" or "unlock" setting, and if it is locked the method 700 will unlock the transceiver port (step 705). A small form factor pluggable transceiver (SFP) (and/or small form factor optical transceiver) is plugged into a small form factor transceiver cage/port of the network device (step 706). The administrator and/or root user of the network device sets (e.g., remotely and/or dynamically) the network port status to a "lock" indication (step 708) and issues a command for a dynamically controlled locking mechanism (e.g., solenoid, button, pin, lock, bar, or other type of device used for locking) to be selectively positioned, for locking the transceiver into a slot opening in the transceiver and locking the SFP transceiver into the network device (e.g. the dynamically controlled locking mechanism raised upward and away from the transceiver cage/port base into a slot opening/groove opening of the small form factor transceiver cage/port for inserting a locking pin device/button into the slot opening and locking in the transceiver) (step 710). The command may be a command line interface (CLI) or a graphical user interface (GUI). In this "locked" state, the dynamically controlled locking mechanism prevents removal of the small form factor transceiver by remaining in a locked position until receipt of a release/unlock command. The administrator and/or a root user of the network device sets (e.g., dynamically and/or remotely) the network port status to a "unlock" indication (step 712) and issues a command for the dynamically controlled locking mechanism to be selectively positioned for unlocking the locking mechanism from the transceiver (e.g. lowers a locking bin/button device downward and away from the slot opening/groove opening of the SFP transceiver cage/port and/or the SFP transceiver device towards the small form factor transceiver cage base/circuit board) (step 714). In other words, if the network port is set (e.g., dynamically and/or remotely) by the administrator and/or the root user of the network device to indicate the small form factor transceiver is either locked or unlocked, the method 700 may either selectively position the dynamically controlled locking mechanism into an unlocked position in the small form factor transceiver, and/or selectively positioning the dynamically controlled locking mechanism into a locked position in the small form factor transceiver if the network device is set to indicate the small form factor transceiver is locked. The command to unlock the locking mechanisms may include removing (e.g., lowering and/or reversing) the dynamically controlled locking mechanism from a slot opening on the small form factor transceiver and/or the small form factor transceiver cage/port towards the network port (e.g., towards the bottom, sides, and/or top of the network port depending on the location of the slot opening on the transceiver and/or the network port). The command to lock the locking mechanisms may include selectively positioning the dynamically controlled locking mechanism to a locked position in the small form factor transceiver by raising the dynamically controlled locking mechanism from the bottom of the network port into a slot opening on the small form factor transceiver and/or the small form factor transceiver cage/port. The command may be a command line interface (CLI) or a graphical user interface (GUI). The method 700 ends (step 716).

Figure 8:
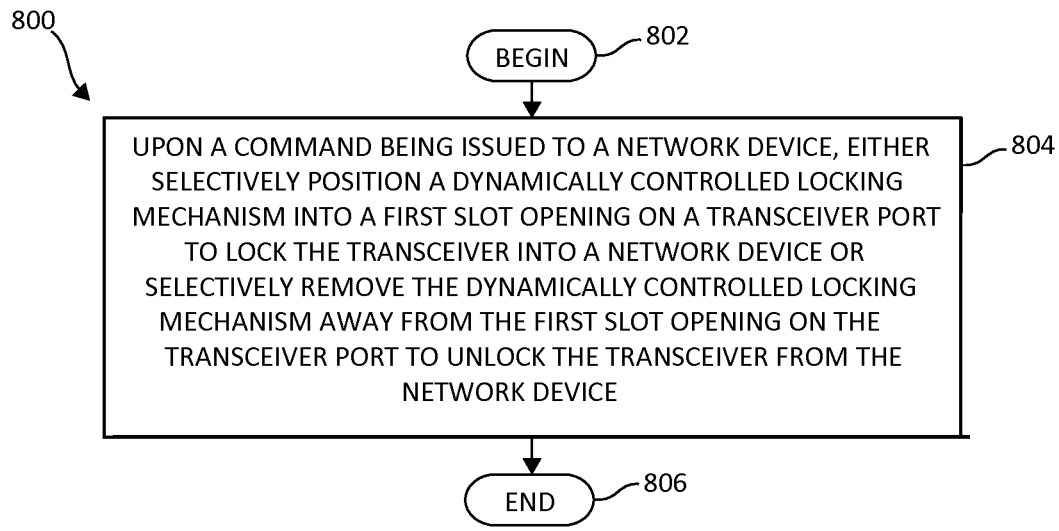
FIG. 8 is a flow chart illustrating an additional exemplary method for locking and unlocking a transceiver in which aspects of the present invention may be realized.

FIG. 8 is a flow chart illustrating an additional exemplary method 800 for locking and/or unlocking a transceiver in which aspects of the present invention may be realized. The method 800 begins (step 802). Upon a command being issued to a network device, the dynamically controlled locking mechanism is either selectively positioned into a first slot opening to lock the transceiver into the network device or selectively removed away from the first slot opening to unlock the transceiver from the network device (step 804). The method 800 ends (step 806).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A transceiver locking assembly, comprising:
    at least one processor device;
    a network device, in a network environment, in communication with the least one processor device;
    a transceiver in communication with the network device;
    a transceiver port, coupled to the network device, defining a first slot opening in at least one of a plurality of positions of the transceiver port and configured for selectively receiving the transceiver; and
    a dynamically controlled locking mechanism, controlled by the at least one processor device, and coupled to the transceiver port:
    wherein, upon a command being issued to the network device, the dynamically controlled locking mechanism is one of selectively positioned into the first slot opening to lock the transceiver into the network device and selectively removed away from the first slot opening to unlock the transceiver from the network device.

2. The transceiver locking assembly of claim 1, wherein the dynamically controlled locking mechanism performs one of:

preventing removal the transceiver until receipt of the command, and preventing an insertion of the transceiver into the transceiver port by a remote command.

3. The transceiver locking assembly of claim 1, wherein the dynamically controlled locking mechanism is a solenoid.

4. The transceiver locking assembly of claim 1, wherein the at least one processor device issues the command to the network device from one of a command line interface (CLI) and a graphical user interface (GUI).

5. The transceiver locking assembly of claim 1, wherein the at least one processor device is configured for issuing the command from one of an administrator and a root user of the network device upon logging into the network environment.

6. The transceiver locking assembly of claim 5, wherein the transceiver port is set by one of the administrator and the root user of the network device to indicate the transceiver is one of locked and unlocked.

7. The transceiver locking assembly of claim 6, wherein, if the one of the administrator and the root user of the network device sets the transceiver port to indicate the transceiver is unlocked, the dynamically controlled locking mechanism is removed from within the first slot opening and set in an unlocked position.

8. The transceiver locking assembly of claim 6, wherein, if the one of the administrator and the root user of the network device sets the transceiver port to indicate the transceiver is locked, the dynamically controlled locking mechanism is inserted into the first slot opening and set in a locked position.

9. The transceiver locking assembly of claim 5, wherein the transceiver defines a second slot opening in at least one of a plurality of positions on the transceiver, wherein, upon the command being issued to the network device, the dynamically controlled locking mechanism is one of selectively positioned into both the first slot opening and the second slot opening to lock the transceiver into the network device and selectively removed away from the first slot opening and the second slot opening to unlock the transceiver from the network device.

10. The transceiver locking assembly of claim 9, wherein, if the one of the administrator and the root user of the network device sets the transceiver port to indicate the transceiver is unlocked, the dynamically controlled locking mechanism is removed from within both the first slot opening and the second slot opening and set in an unlocked position.

11. The transceiver locking assembly of claim 9, wherein, if the one of the administrator and the root user of the network device sets the network port to indicate the transceiver is locked, the dynamically controlled locking mechanism is inserted into both the first slot opening and the second slot opening and set in a locked position.

12. A computer program product for locking a transceiver by a processor device, the computer program product comprising a non-transitory computer-readable storage medium having computer-readable program code portions stored therein, the computer-readable program code portions comprising:

a first executable portion that, upon a command being issued to a network device, performs one of:

selectively positioning a dynamically controlled locking mechanism into a first slot opening on a transceiver port to lock the transceiver into the network device, and selectively removing a dynamically controlled locking mechanism away from the first slot opening on the transceiver port to unlock the transceiver from the network device.

13. The computer program product of claim 12, further including a second executable portion that performs one of:

preventing removal of the transceiver until receipt of the command, and preventing an insertion of the transceiver into the transceiver port by a remote command.

14. The computer program product of claim 12, wherein the dynamically controlled locking mechanism is a solenoid.

15. The computer program product of claim 12, further including a second executable portion that issues the command to the network device from one of a command line interface (CLI) and a graphical user interface (GUI).

16. The computer program product of claim 12, wherein a second slot opening on the transceiver is defined, and further including a second executable portion that:

upon the command being issued to the network device:

selectively positions the dynamically controlled locking mechanism into the first slot opening on the transceiver port and the second slot opening on the transceiver to lock the transceiver into the network device, and selectively removes the dynamically controlled locking mechanism away from the first slot opening on the transceiver port and the second slot opening on the transceiver to unlock the transceiver from the network device.

17. The computer program product of claim 16, further including a third executable portion that issues the command from one of an administrator and a root user of the network device upon logging into the network environment.

18. The computer program product of claim 17, further including a fourth executable portion that sets the transceiver port to indicate the transceiver is one of locked and unlocked by one of the administrator and the root user of the network device.

19. The computer program product of claim 18, further including, if the one of the administrator and the root user of the network device sets the transceiver port to indicate the transceiver is unlocked, a fifth executable portion that selectively removes the dynamically controlled locking mechanism away from the first slot opening on the transceiver port and the second slot opening on the transceiver and sets the dynamically controlled locking mechanism in an unlocked position.

20. The computer program product of claim 16, further including, if the one of the administrator and the root user of the network device sets the transceiver port to indicate the transceiver is locked, a fourth executable portion that:

inserts the dynamically controlled locking mechanism into the first slot opening on the transceiver port and the second slot opening on the transceiver to lock the transceiver into the network device and setting the dynamically controlled locking mechanism in a locked position.

* * * * *